United States Patent
O'Connor

(10) Patent No.: US 7,242,180 B1
(45) Date of Patent: Jul. 10, 2007

(54) ROTATIONALLY ORIENTATED DUAL DIFFERENTIAL HALL EFFECT SPEED AND DIRECTION GEAR TOOTH SENSOR ASSEMBLY

(75) Inventor: Kevin P. O'Connor, Lake Mills, WI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/431,914

(22) Filed: May 10, 2006

(51) Int. Cl.
    *G01B 7/30* (2006.01)
(52) U.S. Cl. ............................... 324/207.2; 324/207.25
(58) Field of Classification Search ................................
          324/207.2–207.25, 173–174
    See application file for complete search history.

(56) References Cited

U.S. PATENT DOCUMENTS

| | | | | |
|---|---|---|---|---|
| 5,581,179 A | * | 12/1996 | Engel et al. | 324/207.2 |
| 5,682,095 A | * | 10/1997 | Mathes et al. | 324/174 |
| 5,912,556 A | * | 6/1999 | Frazee et al. | 324/207.2 |
| 5,963,028 A | * | 10/1999 | Engel et al. | 324/207.2 |
| 6,501,270 B1 | * | 12/2002 | Opie | 324/251 |
| 2003/0141864 A1 | * | 7/2003 | Babin | 324/207.12 |

OTHER PUBLICATIONS

Sales literature for ALLEGRO ATS665LSG gear tooth sensor, copyright 2005 Allegro Microsystems, Inc.

* cited by examiner

*Primary Examiner*—Jay M Patidar
(74) *Attorney, Agent, or Firm*—Lonnie Drayer; Patrick Steinnon

(57) ABSTRACT

Two sensor modules that each contain two Hall effect sensors are positioned with respect to each other and with respect to a circuit board in a gear tooth sensor assembly. The sensor modules are arranged rotated in the plane of a positioning surface 120° with respect to each other, and tilted toward each other 15°. Sensor leads are bent at an angle of 98.64° such that the leads on both sensors pass perpendicularly through holes in a single circuit board tilted at an angle of 4.30° away from a plane tangent to the gear at a point halfway between the sensors. The sensor package is formed by a plastic mounting bracket arranged to position the sensor modules with respect to each other and the circuit board. The first two angles are selected, and the second two angles are determined so that the sensors are inserted perpendicular to the circuit board.

4 Claims, 4 Drawing Sheets

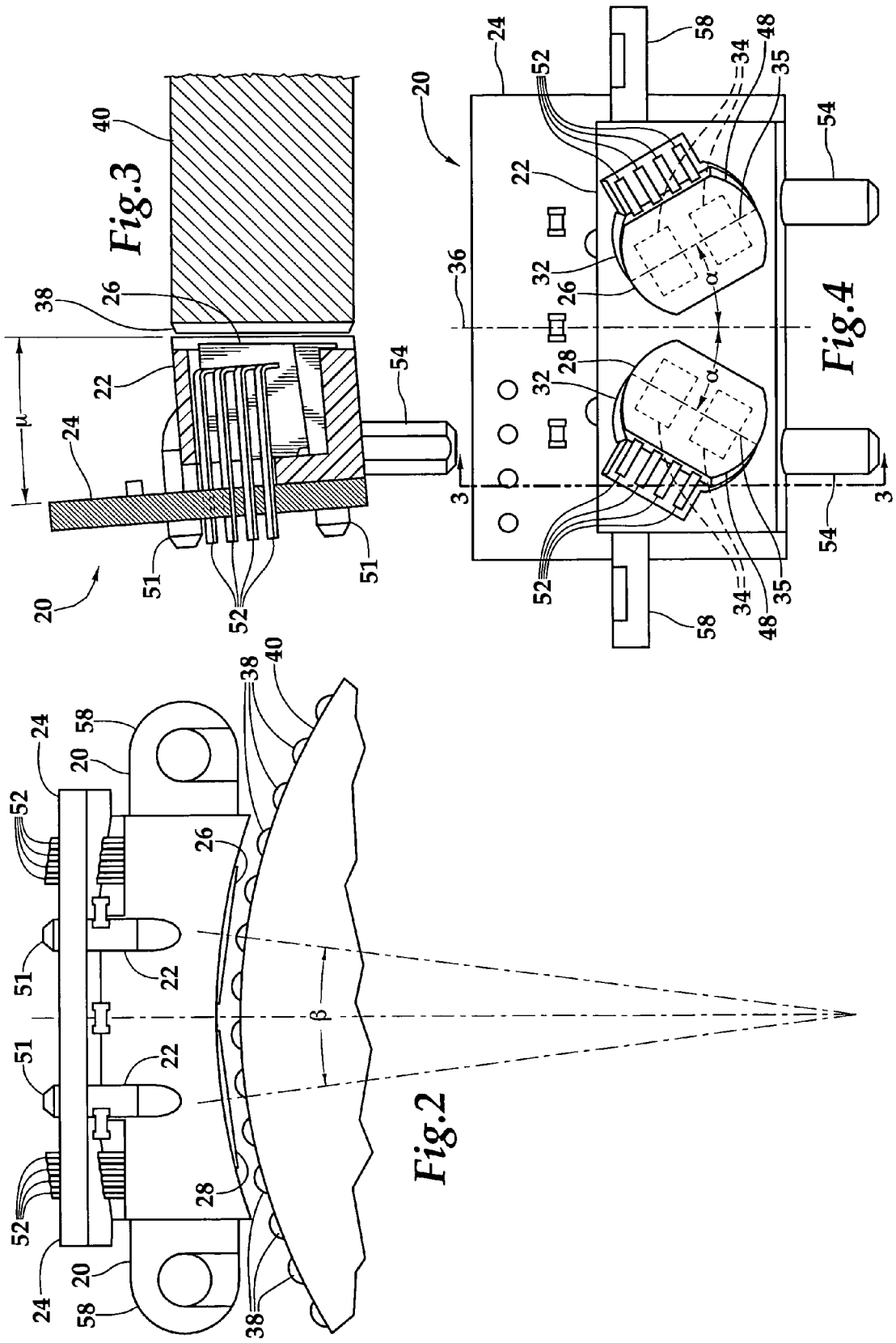

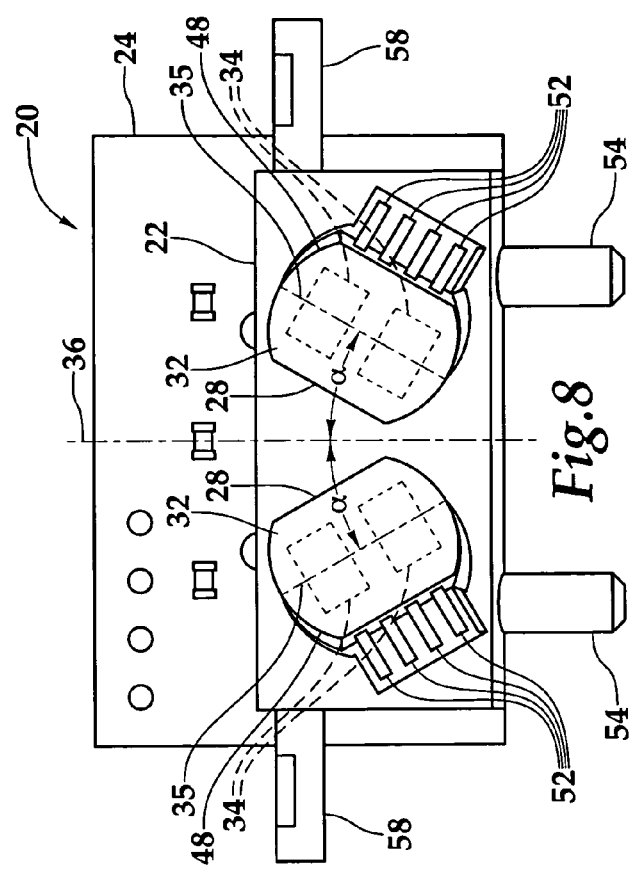
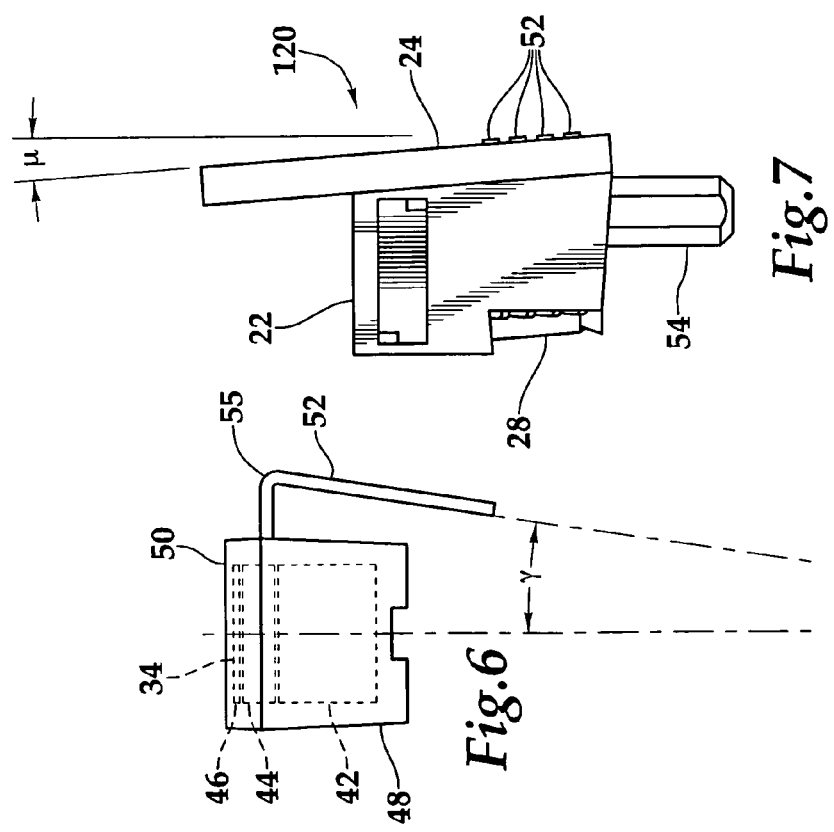

ROTATIONALLY ORIENTATED DUAL DIFFERENTIAL HALL EFFECT SPEED AND DIRECTION GEAR TOOTH SENSOR ASSEMBLY

BACKGROUND OF THE INVENTION

The present invention relates to magnetic field sensors used in sensing gear rotation in general, and to Hall effect sensors mounted to detect ferrous gear teeth in particular.

In order to control a motor using feedback, it is necessary to employ sensors that detect the operation of the motor. If the motor is used to drive a ferrous gear, a simple and reliable sensor that can detect rotation of the ferrous gear can be constructed based on a Hall effect sensor. Sophisticated sensor modules that incorporate a magnet and a ferrous pole piece and one or two Hall effect sensors are available from a number of manufacturers. When the sensor module is placed so that the Hall effect sensors are within about zero to 2.5 mm from the peripheral edge of a ferrous gear, passage of the gear tooth past the Hall effect sensors creates an increase in magnetic field strength which is detected by the Hall effect sensors. By using a sensor module that incorporates two spaced Hall effect sensors it is possible to detect both speed and direction of motion of the gear when the Hall effect sensors are arranged to be spaced in the circumferential direction of motion of the gear. However, greater sensitivity and simplicity in processing the sensor's output can be accomplished by using two sensor modules that are spaced apart, and also arranged such the spacing is a multiple of half the width of the gear tooth, so as to produce a quadrature output which allows determination of the direction of motion of the gear.

In order to have better resolution for smaller toothed gears it is advantageous to control the spacing of the two Hall effect sensors within a single sensor module. Without the considerable extra expense of producing a unique sensor for a particular application, it is possible to adjust the effective spacing between the Hall effect sensors within a single sensor device by rotating the sensor module and thus the included Hall effect sensors in the sensor plane so that, relative to a line at the leading edge of an advancing gear tooth, the distance between the Hall effect sensors is foreshortened. If two Hall effect sensors that have been rotated to control the effective spacing between Hall effect sensors on each sensor module are to be used, a problem arises in mounting the two sensor modules in the proper rotation and angular position relative to each other and to the motor gear.

SUMMARY OF THE INVENTION

The gear tooth sensor assembly of this invention employs two sensor modules which each contain two Hall effect sensors. Each sensor module has a plastic package with leads extending therefrom. The Hall effect sensors within each sensor module are spaced apart and positioned between a magnet and a positioning surface of the plastic package. Each sensor module is positioned tangent to and spaced from a ferrous gear. The sensor modules are spaced about the circumference of the gear so that they are separated by an angle $\beta$ of 15° and such that the spacing is a multiple of one half of the gear tooth width, such that the output from the sensor modules can be combined to produce a quadrature output. Each sensor module is rotated in the plane of the positioning surface such that the spacing between the two Hall effect sensors contained in the sensor module is foreshortened with respect to a line representing an advancing gear tooth as it passes over the two Hall effect sensors within the sensor module. Thus the sensor module is rotated such that a direction defined by the spacing between Hall effect sensors is rotated an angle $\alpha$ of 30° with respect to the line of an advancing gear tooth, effectively reducing the spacing between the sensors by one-half, i.e. sine (30°). The net result is the sensor positioning surfaces are tilted toward each other 7.5° for a total angle of 15° and are rotated 120° relative to each other. Given the two selected angles, $\alpha$ and $\beta$: the rotation in the plane of the positioning surface 30°, and the tilting of the positioning surfaces toward each other 15°, it is possible to determine two other angles $\gamma$, and $\mu$ such that both sensor modules can be mounted with leads perpendicular to the plane of the same circuit board. Each sensor module has four leads that extend from the plastic package parallel to the positioning surface. The leads extend away from the plastic package a short distance and are all bent about an axis a determined angle $\gamma$ of 98.64° referenced to the plane of the positioning surface. The bending axis is a line parallel to the direction defined by the spacing between the Hall effect sensors. The leads on both sensor modules, when bent the determined angle $\gamma$ of 98.64°, will then pass perpendicularly through holes in a single circuit board if the circuit board is tilted at a determined angle $\mu$ of 4.30° away from a plane tangent to the gear at a point halfway between the sensor modules.

A glass filled nylon 6/6 mounting bracket is used to position the sensor modules with respect to each other at the selected angles $\beta$, and $\alpha$. and the remaining angles $\gamma$ and $\mu$ are determined by calculation or by trial and error. The mounting bracket is mounted to a circuit board at the determined angle $\mu$ by protrusions that can be heat staked, and the sensor modules with leads bent at the determined angle $\gamma$ can then be inserted into the mounting bracket and through the attached circuit board.

The housing positions the first sensor module and the second sensor module such that a first plane defined by the Hall effect sensors on the first sensor module and a second plane defined by the Hall effect sensors on the second sensor module intersect at the first angle $\beta$ of 15° and define an intersecting line. The spacing of the two Hall effect sensors on each sensor module define first and second directions which form a substantially identical second angle of $\alpha$ with the intersecting line. The circuit board is mounted to the housing at the angle $\mu$ with respect to a plane tangent to the gear and passing through the intersecting line. The lead bend angle $\gamma$ is selected such that the leads extend perpendicularly toward the circuit board.

The angle $\beta$ which is defined as the angle of separation between center lines of Hall effect sensors as shown in FIG. 2 is selected in accord with the following equation:

$$\beta = \frac{360°}{(N)} \times (y + 0.25)$$

Where:

y=total number of full teeth separating center lines of Hall effect sensors

N=total number of gear teeth on target

EXAMPLE $$\beta = \frac{360}{(102)} \times (4 = 0.25) = 15°$$

The angle α is selected to bring about a desired foreshortening of the spacing between Hall effect sensors 34 preferably about 30°.

The angle γ is defined as the angle of Hall effect sensor lead bend, as shown in FIG. 6, which allows through hole placement onto a printed circuit board and is calculated as follows:

$$Y = \tan^{-1}\left(\frac{\tan\left(\frac{\beta}{2}\right)}{\cos(\alpha)}\right) + 90°$$

EXAMPLE $$Y = \tan^{-1}\left(\frac{\tan\left(\frac{15}{2}\right)}{\cos(30)}\right) + 90° = 98.64°$$

The angle μ is defined as the angle of printed circuit board tilt required to allow sensor modules leads to align perpendicular to the face of the printed circuit board providing a standard through hole assembly and solder joint and is calculated as follows:

$$\mu = 90° - \left(\text{Tan}^{-1}\frac{\cos(\gamma - 90)}{\cos(\alpha)\sin(\gamma - 90)\cos\left(\frac{\beta}{2}\right)}\right)$$

EXAMPLE $$\mu = 90° - \left(\text{Tan}^{-1}\frac{\cos(98.64 - 90)}{\cos(30)\sin(98.64 - 90)\cos\left(\frac{15}{2}\right)}\right) = 4.30°$$

It is a feature of the present invention that two sensor modules can be positioned with respect to each other and a ferrous gear according to selected criteria while being readily mounted to a single circuit board.

It is a further feature of the present invention to provide a gear tooth sensor assembly design wherein two sensor modules can be positioned with two degrees of freedom and still be mounted perpendicular to the same circuit board.

Further features and advantages of the invention will be apparent from the following detailed description when taken in conjunction with the accompanying drawings.

BRIEF DESCRIPTION OF THE DRAWINGS

FIG. 2 is a top plan view of the gear tooth sensor assembly of FIG. 1.

FIG. 3 is a side cross-sectional view of the gear tooth sensor assembly of FIG. 4, taken along section line 3-3.

FIG. 4 is a front elevation view of the gear tooth sensor assembly of FIG. 1.

FIG. 6 is side elevation view of the sensor module used in the gear tooth sensor assembly of FIG. 1.

FIG. 7 is a side elevation view of an alternative embodiment gear tooth sensor assembly of this invention.

FIG. 8 is a front elevation view of the gear tooth sensor assembly of FIG. 7.

DETAILED DESCRIPTION OF THE INVENTION

Figure 1:
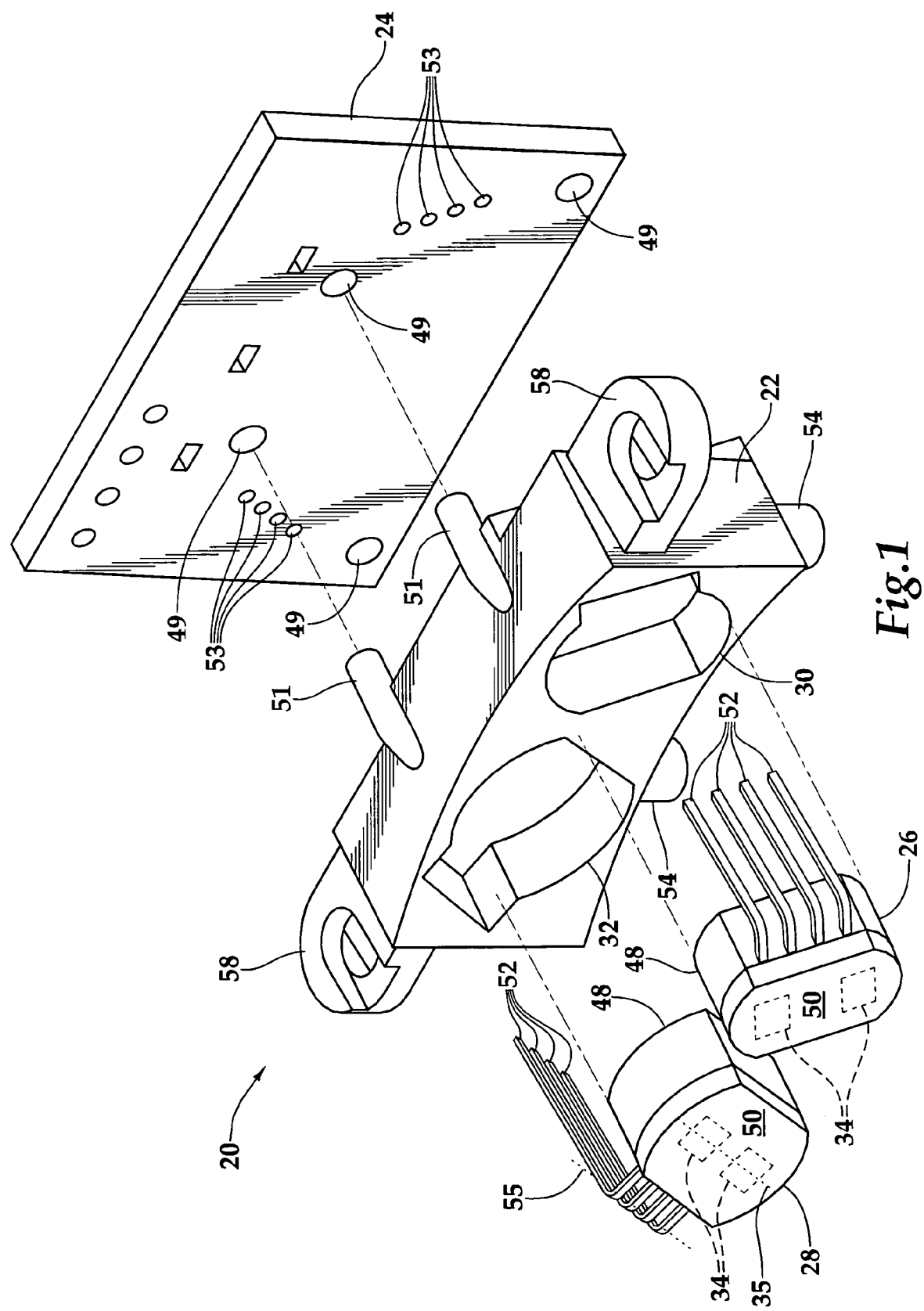
FIG. 1 is a front elevation exploded isometric view of the gear tooth sensor assembly of this invention.
Figure 5:
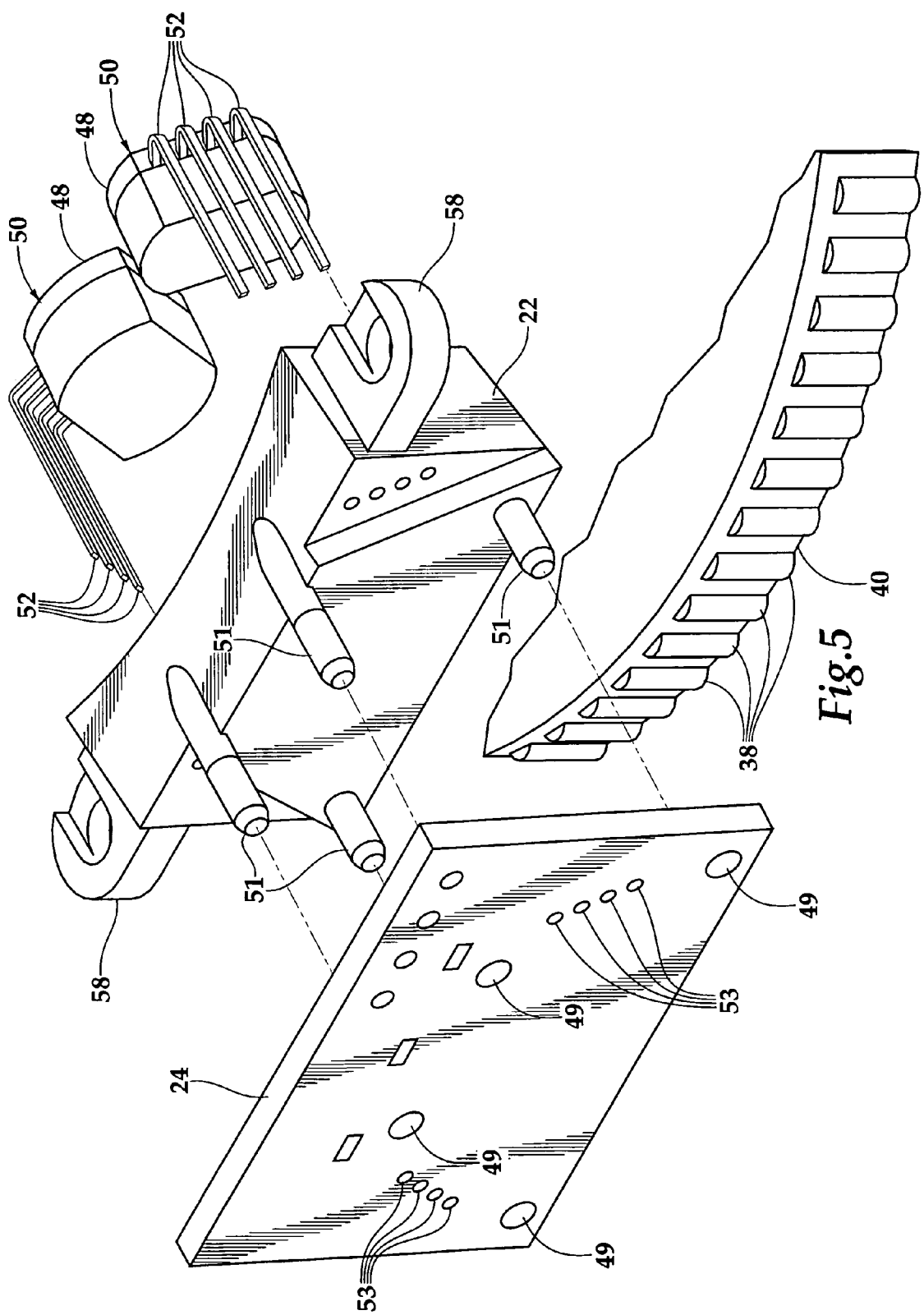
FIG. 5 is a rear elevation exploded isometric view of the gear tooth sensor assembly of FIG. 1.

Referring more particularly to FIGS. 1-8, wherein like numbers refer to similar parts, a gear tooth sensor assembly 20 is shown in FIGS. 1-5. The gear tooth sensor assembly 20 comprises a housing 22, a circuit board 24, and a pair of sensor modules 26, 28. The housing 22 has a first receiving cavity 30 to hold and position a first sensor module 26, and a second receiving cavity 32 to hold and position the second sensor module 28. The sensor modules 26, 28 are, for example, devices sold by Allegro MicroSystems, Inc. of Worcester, Mass., under the part number ATS642LSH. Two individual Hall effect sensors 34 are contained within each sensor module 26, 28. The distance between the individual Hall effect sensors 34 defines a direction 35 and a spacing. The spacing is for example 2.2 mm for the above referenced part. The effective spacing between the Hall effect sensors 34 can be reduced with respect to an advancing line 36, shown in FIG. 4, which represents the leading edge of the gear tooth 38 of the gear 40 shown in FIG. 5. The effective spacing can be reduced by rotating the sensor modules 26, 28 so that a line corresponding to the direction 35 is angled with respect to the advancing line 36. As shown in FIG. 4, the sensor modules 26, 28 are angled at an angle α of 30° with respect to the line 36 representing the leading edge of the gear tooth, to thereby effectively foreshorten the distance between Hall effect sensors 34 by the sine (30°). For example, an actual spacing of 2.2 mm is reduced to an effective spacing of 1.1 mm.

The sensor modules 26, 28, as shown in FIG. 6, are comprised of a magnet 42, a ferrous pole piece 44, and a Hall effect integrated circuit 46 with the two spaced apart Hall effect sensors 34 molded into the plastic packaging 48 that defines a positioning surface 50. The positioning surfaces 50, and sensors 34, are positioned tangent to and spaced from the gear teeth 38 of the gear 40 approximately 0-2.5 mm. Rotation of each sensor module 26, 28 takes place in a plane defined by the sensor module's positioning surface 50. As shown in FIG. 2, the necessity of having each Hall effect sensor 34 tangent to the gear means that the planes defined by the positioning surfaces 50 intersect at an angle β of 15° or the radial spacing of the sensors 26, 28. Preferably the angle β is selected so that the spacing between the Hall effect sensors results in a quadrature output when the outputs of the individual sensor modules 26, 28 are combined. This condition is met when the spacing between sensor modules is a multiple of one half the gear tooth width.

To achieve simple and cost-effective assembly, the mounting bracket is mounted to a circuit board at a determined angle μ by protrusions 51 that can be heat staked and pass through holes 49 in the circuit board 24, such that leads 52 which extend from the plastic package of the sensor modules 26, 28 extend perpendicularly through holes 53 so as to intersect at right angles the single planar circuit board 24. The leads 52 initially extend from the plastic packaging 48 parallel to the positioning surface 50 and are bent about an axis 55 in the plane of the leads that is parallel to the direction 35 defined by the spacing between the Hall effect sensors 34. The bend angle γ is 98.64° and thus the leads 52 of both sensor modules are perpendicular to a plane defined by the circuit board 24 which is tipped at an angle μ of 4.30° with respect to a plane tangent to the gear 40 at the line 36 between the sensor modules 26, 28.

The housing 22 incorporates positioning posts 54 that are mounted to the gear housing (not shown) and mounting ears 58 to allow the housing 22 to be attached by screws (not shown) to portions of the gear housing (not shown).

An alternative embodiment gear sensor 120 is shown in FIGS. 7 and 8. The gear sensor 120 is identical to the gear sensor 20 except the direction 35 defined by the distance between the individual Hall effect sensors has been rotated 60° and the circuit board 24 now tilts toward, not away from, the plane tangent to the gear 40 at the line 36 between the sensor modules 26, 28. The bend angle γ remains 98.640 and the leads 52 of both sensor modules are perpendicular to the plane defined by the circuit board 24 that is tipped at an angle μ of −4.30°. Essentially the same arrangement can be achieved by simply inverting the gear sensor 20.

The angle μ is still defined as the angle of printed circuit board tilt required to allow the sensor module leads to align perpendicular to the face of the printed circuit board providing a standard through hole assembly and solder joint. However, because the sensor has been turned upside down the sign of the angles is reversed and is now calculated as follows:

$$\mu = \left( \text{Tan}^{-1} \frac{\cos(\gamma - 90)}{\cos(\alpha)\sin(\gamma - 90)\cos\left(\frac{\beta}{2}\right)} \right) - 90°$$

EXAMPLE $$\mu = \left( \text{Tan}^{-1} \frac{\cos(98.64 - 90)}{\cos(30)\sin(98.64 - 90)\cos\left(\frac{15}{2}\right)} \right) - 90° = -4.30°$$

It should be understood that the spacing of the Hall effect sensors 26, 28 in the circumferential direction and therefore the angle α as well as the angle of rotation β of the individual sensors in the plane of the positioning surface are design variables which may be optimized for a particular gear tooth sensor assembly. Further, it is to be understood that the angles γ to which the leads 52 are bent and the angle μ of the circuit board with respect to a plane tangent to the gear 40 at a point midway between the sensors 26, 28 are derived values selected to achieve the end condition that the leads 52 are perpendicular to the circuit board 24 and thus easily inserted into the circuit board.

It should be understood that the angle β is selected so that the individual Hall effect sensors 34 are tangent to the gear 40, and the angle α is selected to adjust the effective spacing between the individual Hall effect sensors 34 of the sensor modules 26, 28. The angles β and α are both nonzero such that the circuit board angle μ is also nonzero.

It should be understood that the gear sensor 20 has the advantage that it uses standard sensor modules to determine the direction and speed of rotation of a gear. Further, the effective spacing between two or more Hall effect sensors 34 within the sensor modules 26, 28 can be readily adjusted by design of the mounting. Further, the spacing of the sensor modules 26, 28 can be selected such that the signals from each of the two sensor modules are 90° out of phase, allowing them to be combined in a quadrature output which enables a controller to determine the direction of rotation of the gear.

It is understood that the invention is not limited to the particular construction and arrangement of parts herein illustrated and described, but embraces all such modified forms thereof as come within the scope of the following claims.

I claim:

1. A gear tooth sensor assembly comprising:
a housing;
a first sensor module mounted to the housing and further comprising a first Hall effect sensor and a second Hall effect sensor spaced apart in a first plane and defining a first direction of spacing which lies in the first plane;
a first plurality of leads extending from the first sensor module parallel to the first plane, each of the first plurality of leads being bent about an axis parallel to the first direction at a lead bend angle;
a second sensor module mounted to the housing and further comprising a third Hall effect sensor and a fourth Hall effect sensor spaced apart in a second plane and defining a second direction of spacing which lies in the second plane;
a second plurality of leads extending from the second sensor module parallel to the second plane, the second plurality of leads being bent about an axis parallel to the second direction at the lead bend angle;
a circuit board lying in a single plane and mounted to the housing; wherein the housing positions the first sensor module and the second sensor module such that the first plane and the second plane intersect in a first angle and defines an intersecting line, and the first direction of spacing and the second direction of spacing each form a substantially identical second angle with the intersecting line; and
wherein the circuit board is mounted to the housing at a third angle with respect to the intersecting line such that the first angle and the second angle are selected to be nonzero and the lead bend angle and the third angle are selected so that the first plurality of leads and the second plurality of leads extend perpendicularly toward the circuit board.

2. The gear tooth sensor assembly of claim 1 wherein the second angle is about 30 degrees.

3. A method of determining the geometric positions of two sensor modules in a gear tooth sensor, the method comprising the steps of:
determining the gear tooth spacing about a circumference of a gear to be monitored;
positioning a first sensor module so that a first pair of spaced apart individual Hall effect sensors contained within the first sensor module are parallel to a plane tangent to the circumference of the gear, and positioned at an angle with respect to a line representing an advancing gear tooth, such that a space defined between the first pair of spaced apart individual Hall effect sensors is foreshortened with respect to the advancing gear tooth;

positioning a second sensor module circumferentially spaced from the first sensor module, so that a second pair of spaced apart individual Hall effect sensors contained within the second sensor module are parallel to a plane tangent to the circumference of the gear, and at the angle with respect to the line representing an advancing gear tooth, such that a space defined between the second pair of spaced apart individual Hall effect sensors is foreshortened with respect to the advancing gear tooth; bending a first plurality of leads extending from the first sensor module, and bending a second plurality of leads extending from the second sensor module through a common angle; and mounting the first sensor module and the second sensor module to a single planar circuit board such that the first plurality of leads and the second plurality of leads extend perpendicular to the circuit board.

4. The method of claim 3 wherein the space defined between the first pair of spaced apart individual Hall effect sensors is foreshortened with respect to the advancing gear tooth by about one half, and the space defined between the second pair of spaced apart individual Hall effect sensors is foreshortened with respect to the advancing gear tooth by about one half.

* * * * *